US012184041B2

(12) United States Patent
Sadaka

(10) Patent No.: US 12,184,041 B2
(45) Date of Patent: Dec. 31, 2024

(54) SPARK PLUG

(71) Applicant: Niterra Co., Ltd., Nagoya (JP)

(72) Inventor: Naoki Sadaka, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/619,553

(22) Filed: Mar. 28, 2024

(65) Prior Publication Data

US 2024/0332917 A1 Oct. 3, 2024

(30) Foreign Application Priority Data

Mar. 31, 2023 (JP) ................................ 2023-057001
Feb. 6, 2024 (JP) ................................ 2024-016039

(51) Int. Cl.
*H01T 13/34* (2006.01)
*H01T 13/39* (2006.01)

(52) U.S. Cl.
CPC ............ *H01T 13/34* (2013.01); *H01T 13/39* (2013.01)

(58) Field of Classification Search
CPC ................................ H01T 13/34; H01T 13/39
See application file for complete search history.

(56) References Cited

U.S. PATENT DOCUMENTS 9,853,423 B1 * 12/2017 Sumoyama ............ H01T 13/38
2004/0036395 A1 * 2/2004 Makino .................. H01T 13/39 313/141
2010/0259154 A1 * 10/2010 Nakamura ............. H01T 13/39 445/7
2010/0283373 A1 * 11/2010 Kameda ................. H01T 21/02 313/141
2014/0210335 A1 * 7/2014 Fujimura ............... H01T 13/34 313/141
2015/0333487 A1 * 11/2015 Katsuraya .............. H01T 13/20 313/142
2017/0187170 A1 * 6/2017 Sumoyama ............ H01T 13/39
2018/0366917 A1 * 12/2018 Ozeki ..................... H01T 13/36
2019/0214792 A1 * 7/2019 Ohno ...................... H01T 13/32

FOREIGN PATENT DOCUMENTS

JP 06-036856 A 2/1994

* cited by examiner

*Primary Examiner* — Kevin Quarterman
(74) *Attorney, Agent, or Firm* — KUSNER & JAFFE

(57) ABSTRACT

A spark plug includes a center electrode extending along an axial line and includes a front end portion projecting from an insulator, in a section including the axial line, the front end portion includes a proximal end positioned at a front end of the insulator and an electrode tip end. At least one outline appearing in the section and connecting the proximal end and the electrode tip end of the front end portion to each other includes one or more recessed portions recessed toward the axial line, and a value R/A obtained by dividing a curvature radius R of a rear-end recessed portion, of the one or more recessed portions, closest to the proximal end by a distance A between the rear-end recessed portion and the electrode tip end in the direction of the axial line is more than or equal to 0.12.

8 Claims, 6 Drawing Sheets

SPARK PLUG

FIELD OF THE INVENTION

The present invention relates to a spark plug including an insulator and a center electrode disposed in the insulator.

BACKGROUND OF THE INVENTION

Japanese Patent Application Laid-Open No. 6-36856 discloses an existing technology related to a spark plug including an insulator and a center electrode including a front end portion projecting from a front end of the insulator.

In the existing technology, force bending the center electrode is applied to the front end portion of the center electrode due to the combustion pressure of an engine. Smaller bending stress in the front end portion of the center electrode is preferable for improving a property such as the durability of the spark plug.

The present invention has been made to meet the above requirement, and an object thereof is to provide a spark plug that can decrease the bending stress in a front end portion of a center electrode.

SUMMARY OF THE INVENTION

To achieve the object, in accordance with a first aspect of the present invention, there is provided a spark plug including an insulator having an axial hole extending from a front end toward a rear end side and a center electrode disposed in the axial hole of the insulator and extending along an axial line, the center electrode includes a front end portion projecting from the front end of the insulator, and, in a section including the axial line, the front end portion includes a proximal end positioned at the front end of the insulator and an electrode tip end having a width smaller than a width of the proximal end. At least one outline appearing in the section and connecting the proximal end and the electrode tip end of the front end portion to each other includes one or more recessed portions recessed toward the axial line, and a value R/A obtained by dividing a curvature radius R of a rear-end recessed portion, of the one or more recessed portions, closest to the proximal end by a distance A between the electrode tip end and the rear-end recessed portion in the direction of the axial line is more than or equal to 0.12.

In accordance with a second aspect, in the first aspect, the value R/A is more than or equal to 0.22.

In accordance with a third aspect, in the first or second aspect, a thickness C, in a direction vertical to the axial line, of the front end portion at the rear-end recessed portion is more than or equal to 0.8 mm.

In accordance with a fourth aspect, in the third aspect, the distance A is less than or equal to 0.9 mm, and the thickness C is less than or equal to 0.9 mm.

In accordance with a fifth aspect, in the third or fourth aspect, a value C/A obtained by dividing the thickness C by the distance A is more than or equal to 1.42.

In accordance with a sixth aspect, in any one of the first to fifth aspects, the front end portion includes a base material including the proximal end, a tip including the electrode tip end and containing a noble metal, and a melt portion formed between the tip and the base material. The base material includes the rear-end recessed portion. The at least one outline comprises two outlines, and the melt portion is formed continuously between the two outlines positioned on both sides relative to the axial line.

In accordance with a seventh aspect, in any one of the first to sixth aspects, the front end portion includes a first portion including the proximal end, a second portion adjacent to a front end side of the first portion and narrower than the first portion, a tip including the electrode tip end and containing a noble metal, and a melt portion formed between the tip and the second portion. The rear-end recessed portion is positioned at a boundary of the first portion and the second portion.

In accordance with an eighth aspect, in any one of the first to seventh aspects, the value R/A is less than or equal to 0.3.

The bending stress in the front end portion can be decreased because the value R/A, which is obtained by dividing the curvature radius R of the rear-end recessed portion, of the one or more recessed portions of the outline of the front end portion, closest to the proximal end of the front end portion by the distance A between the rear-end recessed portion and the electrode tip end in the direction of the axial line, is more than or equal to 0.12.

DETAILED DESCRIPTION OF THE INVENTION

Figure 1:
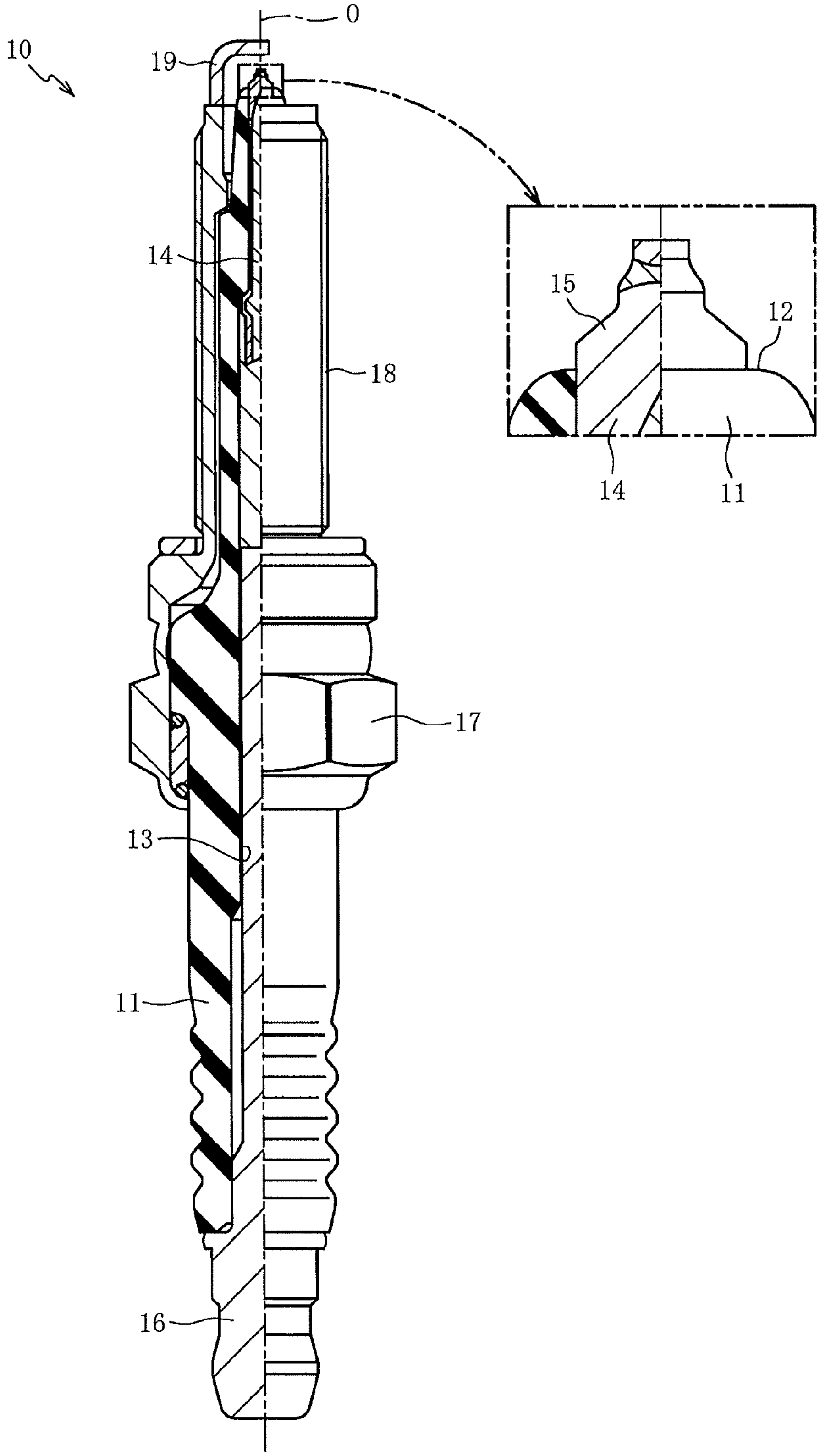
FIG. 1 is a half-sectional view of a spark plug according to an embodiment.

Hereinafter, a preferred embodiment of the present invention will be described with reference to the accompanying drawings. FIG. 1 is a half-sectional view of a spark plug 10 of an embodiment and includes an appearance and a full-sectional view that are combined with each other with an axial line O of the spark plug 10 as the boundary. The lower side on the paper sheet of FIG. 1 is referred to as the rear end side of the spark plug 10, and the upper side on the paper sheet of FIG. 1 is referred to as the front end side of the spark plug 10 (the same applies to FIGS. 2 and 3).

As FIG. 1 illustrates, the spark plug 10 includes an insulator 11 and a center electrode 14 held in the insulator 11. The insulator 11 is a substantially cylindrical member made of ceramic, such as alumina, excellent in mechanical property and excellent in insulation performance under high temperature. The insulator 11 has an axial hole 13 extending from a front end 12 toward the rear end side of the insulator 11 along the axial line O.

The center electrode 14 is a rod-shaped conductor disposed in the axial hole 13 of the insulator 11 and extending along the axial line O. The center electrode 14 includes a core material containing copper as a main component and a bottomed cylindrical metal covering the core material. The core material may be omitted. An Ni-base alloy is given as an example of the metal constituting the center electrode 14. The center electrode 14 includes a front end portion 15 projecting from the front end 12 of the insulator 11. The front end portion 15 is provided on the axial line O.

In the axial hole 13, the center electrode 14 is electrically connected to a metal terminal 16. The metal terminal 16 is a rod-shaped member to which an ignition system (not illustrated) is connected, and the metal terminal 16 is made of a conductive metal material (such as low-carbon steel). The front end side of the metal terminal 16 is inserted into the axial hole 13, and the metal terminal 16 is fixed to the rear end side of the insulator 11 with a rear end of the metal terminal 16 projecting from the insulator 11.

A metal shell 17 is fixed to the periphery of the insulator 11. The metal shell 17 is a cylindrical member made of a metal material (such as low-carbon steel). An external thread 18 that is coupled to an internal thread of a plug hole of an engine (not illustrated) is provided for the metal shell 17. The front end 12 of the insulator 11 is positioned on the front end side relative to a front end portion of the external thread 18. A ground electrode 19 is connected to the front end portion of the external thread 18.

The ground electrode 19 is a conductor extending from the metal shell 17 toward the axial line O. A core material containing copper as a main component is embedded in the ground electrode 19. The core material may be omitted. In the present embodiment, the ground electrode 19 is bent from the metal shell 17 toward the front end side of the front end portion 15 of the center electrode 14.

Figure 2:
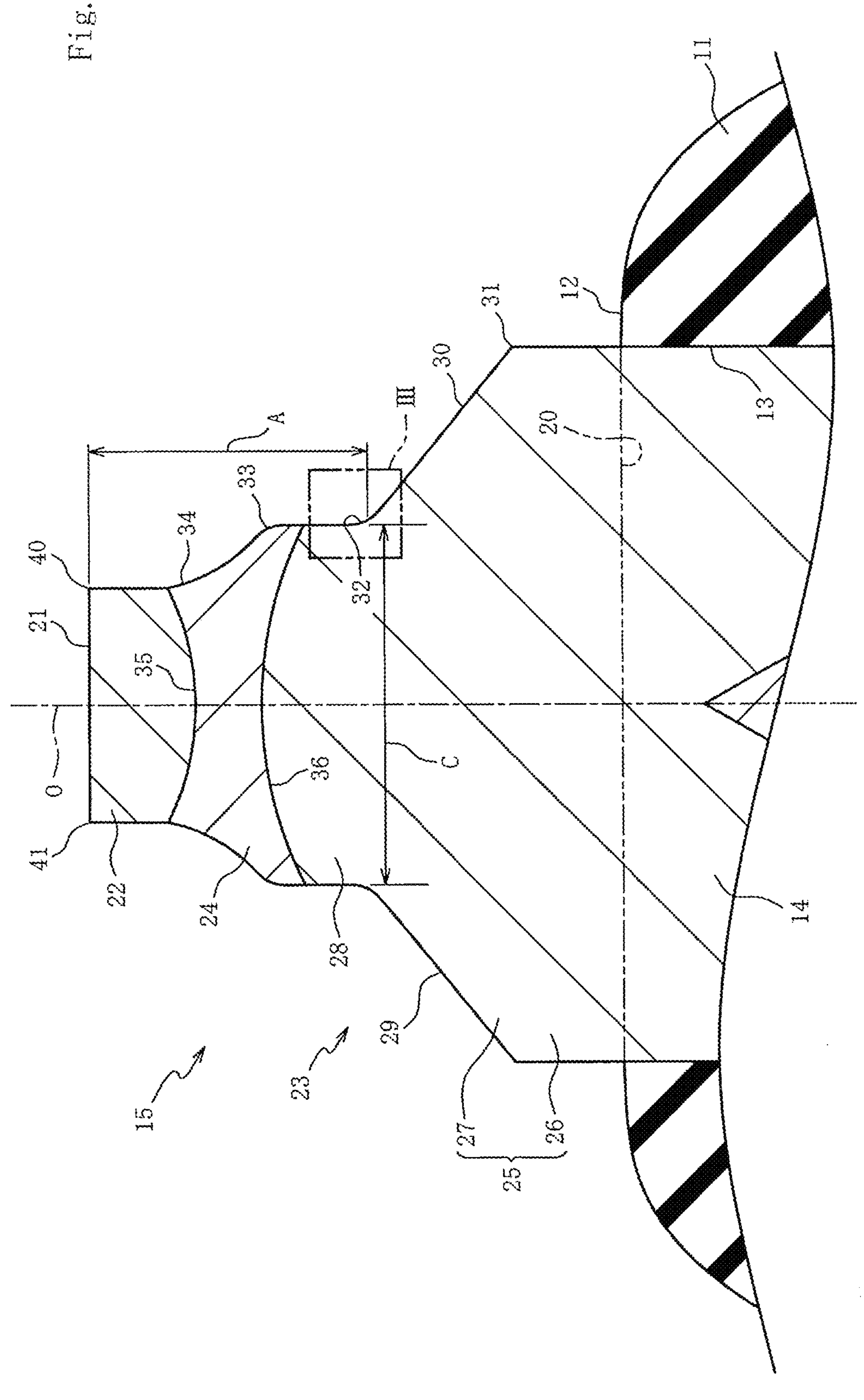
FIG. 2 is a sectional view of a front end portion of a center electrode.

FIG. 2 is a sectional view, of the front end portion 15 of the center electrode 14, including the axial line O. The front end portion 15 is a portion of the center electrode 14 positioned on the front end side relative to the front end 12 of the insulator 11. The front end portion 15 includes a proximal end 20 positioned at the front end 12 of the insulator 11 in the direction of the axial line O and includes an electrode tip end 21 having a width smaller than the width of the proximal end 20. The axial line O extends through the centroid of the electrode tip end 21. The centroid of the electrode tip end 21 is a geometrical center calculated by known means when a face of the electrode tip end 21 is viewed as a plane figure.

In the present embodiment, the front end portion 15 includes a tip 22 including the electrode tip end 21, a base material 23 including the proximal end 20, and a melt portion 24 formed by melting the base material 23 and the tip 22. The tip 22 contains one or more types selected from noble metal elements such as Pt, Ir, Ru, and Rh. The base material 23 is a metal material to which the tip 22 is welded. In the present embodiment, the melt portion 24 is formed by laser beam welding. As a matter of course, the melt portion 24 may be provided by a process such as resistance welding.

In the present embodiment, the front end portion 15 includes a first portion 25 including the proximal end 20, a second portion 28 adjacent to the front end side of the first portion 25, the tip 22, and the melt portion 24 formed by melting the tip 22 and the second portion 28. The second portion 28 is narrower than the first portion 25. The first portion 25 and the second portion 28 are each a metal material constituting the base material 23. The first portion 25 and the second portion 28 are formed by plastic forming of a metal material.

In the present embodiment, the first portion 25 includes a circular columnar portion 26 including the proximal end 20 and a conical portion 27 adjacent to the front end side of the circular columnar portion 26. The circular columnar portion 26 is fitted in the axial hole 13. The circular columnar portion 26 has a circular columnar shape having substantially the same thickness throughout the overall length thereof in the direction of the axial line, and the conical portion 27 has a conical shape tapered toward the front end side. The second portion 28 is adjacent to the front end side of the conical portion 27. The second portion 28 has a circular columnar shape having substantially the same thickness throughout the overall length thereof in the direction of the axial line. Although the first portion 25 and the second portion 28 are formed into one piece by plastic forming, this is not the only option. As a matter of course, the first portion 25 and the second portion 28 may be joined by a process such as welding or diffusion welding.

In FIG. 2, two outlines 29 and 30 illustrating the external shape of the front end portion 15 appear, with the axial line O therebetween, on both sides relative to the axial line O. The outlines 29 and 30 each connect the proximal end 20 and the electrode tip end 21 of the front end portion 15. The outlines 29 and 30 are substantially symmetrical about the axial line O. Thus, one of the outlines 29 and 30, that is, the outline 30 will be described, and the description of the outline 29 will be omitted.

In the outline 30, a protruding portion 31 protruding in a direction away from the axial line O, a recessed portion 32 recessed toward the axial line O, a protruding portion 33 protruding in a direction away from the axial line O, and a recessed portion 34 recessed toward the axial line O are connected to one another in this order from the proximal end 20 toward the electrode tip end 21. The protruding portion 31 is a portion at which the circular columnar portion 26 and the conical portion 27 are connected, and the recessed portion 32 is a portion at which the first portion 25 (the conical portion 27) and the second portion 28 are connected. The protruding portion 33 is positioned close to a rear end of the melt portion 24, and the recessed portion 34 is a portion at which the melt portion 24 and the tip 22 are connected.

The melt portion 24 is formed continuously between the two outlines 29 and 30 that are positioned on both sides relative to the axial line O. Because the melt portion 24 is formed continuously, an interface 35 between the tip 22 and the melt portion 24 and an interface 36 between the base material 23 and the melt portion 24 each connect the outline 29 and the outline 30 to each other. The recessed portion 32 is positioned between the interface 36 and the proximal end 20. Because the melt portion 24 is formed continuously, the joint areas formed by the melt portion 24 positioned between the tip 22 and the base material 23 can be increased compared with when the melt portion 24 is not formed continuously between the outlines 29 and 30. Thus, the joint strength of the tip 22 can be increased.

From the electrode tip end 21, the distance of the recessed portion 32, of the recessed portions 32 and 34, closest to the proximal end 20 is longer than that of the recessed portion 34. Thus, when force bending the center electrode 14 (refer to FIG. 1) is applied to the front end portion 15 due to the combustion pressure of the engine (not illustrated), the bending stress in the recessed portion 32 is likely to be larger than the bending stress in the recessed portion 34. Accordingly, a value R/A serves as an index of the bending stress in the front end portion 15 and is obtained by dividing a curvature radius R of the recessed portion 32 (a rear-end recessed portion), of the recessed portions 32 and 34, closest to the proximal end 20 by a distance A between the rear-end recessed portion 32 and the electrode tip end 21 in the direction of the axial line.

Figure 3:
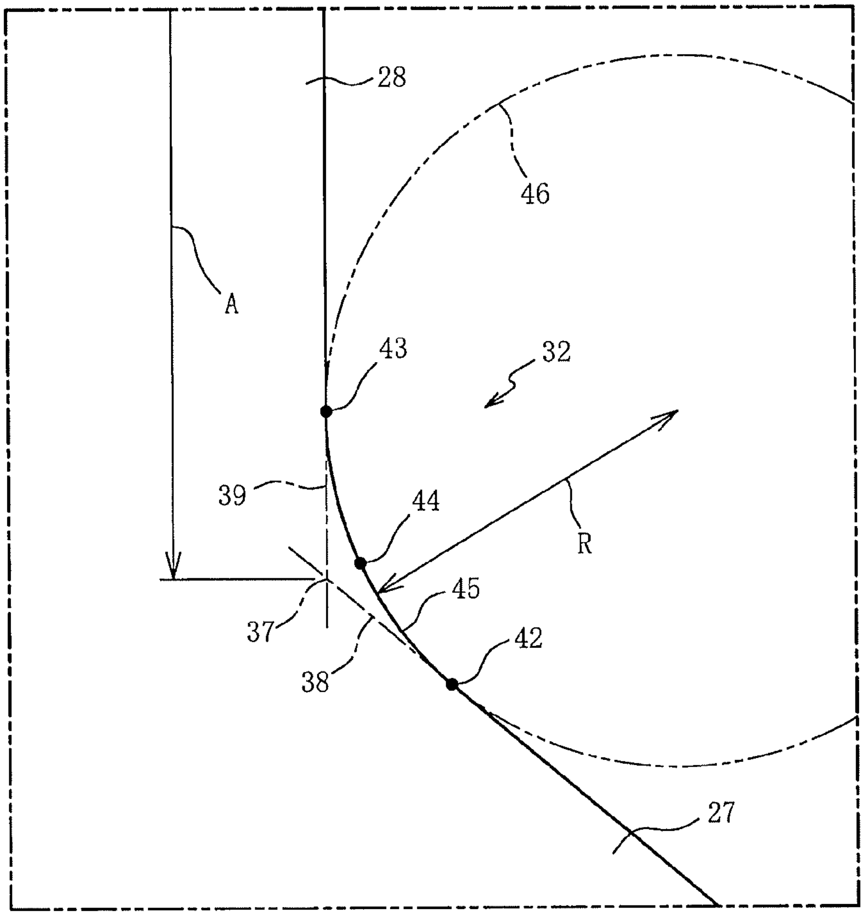
FIG. 3 is a sectional view of a rear-end recessed portion with the part denoted by III in FIG. 2 being enlarged.

FIG. 3 is a sectional view of the rear-end recessed portion 32 with the part denoted by III in FIG. 2 being enlarged. A starting point 37, on the rear-end recessed portion 32 side, from which the distance A between the rear-end recessed portion 32 and the electrode tip end 21 starts is a point at which a line 38 that is an extension line, to the front end side, of a linear portion of an outline of the conical portion 27 and a line 39 that is an extension line, to the rear end side, of a linear portion of an outline of the second portion 28 intersect each other. In the present embodiment, the electrode tip end 21 (refer to FIG. 2) and the axial line O are orthogonal to each other. Thus, an end point, on the electrode tip end 21 side, at which the distance A ends may be selected from any one of edges 40 and 41 of the electrode tip end 21. When the electrode tip end 21 and the axial line O intersect diagonally, one of the edges 40 and 41, of the electrode tip end 21, from which the distance A is longer serves as the end point of the distance A.

The curvature radius R of the rear-end recessed portion 32 is a radius of a circle 46 including, as a part, a circular arc 45 extending through three points including a point 42 positioned immediately before a spot where the outline 30 and the line 38 are separated from each other, a point 43 positioned immediately before a spot where the outline 30 and the line 39 are separated from each other, and a midpoint 44 of the point 42 and the point 43. The distance between the point 42 and the midpoint 44 is equal to the distance between the point 43 and the midpoint 44. When a portion of the outline 30 between the point 42 and the point 43 is a smooth curved line (circular arc) without an inflection point, a curved line following the outline 30 serves as the circular arc 45.

When the portion of the outline 30 between the point 42 and the point 43 is not a circular arc but, for example, a line including an inflection point, a circular arc is not shaped when the outline 30 is followed. Thus, without following the outline 30, the midpoint 44 is determined at a position on or in the vicinity of the outline 30, and the circular arc 45 extending through the three points including the points 42 and 43 and the midpoint 44 is then drawn. The midpoint 44 is determined at a position such that the circular arc 45 extending through the three points including the points 42 and 43 and the midpoint 44 is an approximate curve being representative of the outline 30.

The two outlines 29 and 30 are on both sides relative to the axial line O, and the rear-end recessed portions 32 are thereby on the respective outlines 29 and 30. When the curvature radius R of the rear-end recessed portion 32 on the outline 29 and the curvature radius R of the rear-end recessed portion 32 on the outline 30 differ, the smaller curvature radius R is adopted to obtain the value R/A.

Description here will be made with reference to again FIG. 2. A thickness C is the thickness, in a direction vertical to the axial line O, of the front end portion 15 at the rear-end recessed portion 32. In the present embodiment, the thickness C is equal to the diameter of a rear end of the second portion 28. The bending stress in the rear-end recessed portion 32 when force bending the center electrode 14 is applied to the front end portion 15 is smaller as the curvature radius R of the rear-end recessed portion 32 is larger, and is smaller as the distance A is smaller. The bending stress in the rear-end recessed portion 32 is smaller as the thickness C is larger. Namely, the larger value R/A and the larger thickness Care advantageous for decreasing the bending stress in the rear-end recessed portion 32.

Figure 4:
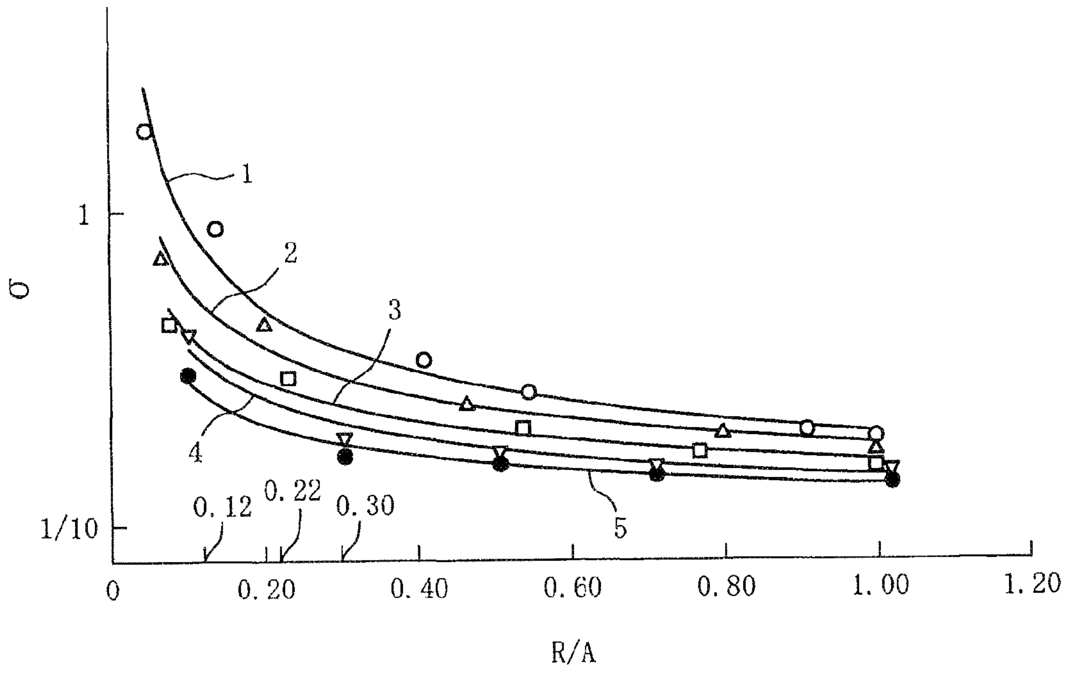
FIG. 4 illustrates the relationship between a value R/A and the bending stress in the rear-end recessed portion.

FIG. 4 illustrates the relationship between the value R/A and the bending stress σ in the rear-end recessed portion 32. FIG. 4 illustrates a graph in which, over samples Nos. 1 to 5 given in Table 1 and differing in distance A and thickness C, the bending stress σ when the curvature radius R is changed is calculated, the value R/A is given on the horizontal axis, and the bending stress σ is given on the vertical axis. The numbers given for graphs are the numbers of the samples Nos. 1 to 5. The scales of the vertical axis indicate, with a basic value of the bending stress being set to 1, the basic value and the value one-tenth of the basic value.

TABLE 1

| No. | A (mm) | C (mm) |
|---|---|---|
| 1 | 3.13 | 0.85 |
| 2 | 2.13 | 0.85 |
| 3 | 1.87 | 0.85 |
| 4 | 1.73 | 0.70 |
| 5 | 1.73 | 0.85 |

It has been confirmed that the bending stress σ is smaller as the value R/A is larger, and the gradient of a tangent of each of the graphs of the bending stress σ is smaller as the value R/A is larger as FIG. 4 illustrates. It has been clear that, in the sample No. 1 in which A is the longest and the bending stress is the largest of the five samples, when R/A is more than or equal to 0.12, the bending stress can be made less than or equal to 66% relative to the bending stress in the case of R/A=0.045 (R=0.14 mm). In each of the samples Nos. 1 to 5, when R/A is more than or equal to 0.12, the inclination of the graph is decreased compared with when R/A is less than 0.12. Thus, it has become evident that the bending stress in the rear-end recessed portion 32 can be decreased when R/A is more than or equal to 0.12.

In each of the samples Nos. 1 to 5, the inclination of the graph when the value R/A is more than or equal to 0.22 is further decreased compared with the inclination of the graph when R/A is less than 0.22. Thus, it has become evident that R/A is more preferably more than or equal to 0.22.

The comparison of the graphs of the samples Nos. 1 to 3 and 5, in which each of the thicknesses C is 0.85 mm but the distances A differ, reveals that the bending stresses σ decrease in the order of Nos. 5, 3, 2, and 1 listed in decreasing order of the distance A. Thus, it has been confirmed that the shorter distance A is preferable for decreasing the bending stress σ in the rear-end recessed portion 32. The distance A is preferably less than or equal to 2.13 mm, more preferably less than or equal to 1.87 mm, further preferably less than or equal to 1.73 mm.

The comparison of the graphs of the samples No. 4 and No. 5 in which the distance A is 1.73 mm reveals that the bending stress σ of the graph of No. 5 in which the thickness C is 0.85 mm is smaller than the bending stress σ of the graph of No. 4 in which the thickness C is 0.70 mm. Thus, for decreasing the bending stress σ in the rear-end recessed portion 32, the larger thickness C of the front end portion 15 at the rear-end recessed portion 32 is preferable, and the thickness C is particularly preferably more than or equal to 0.80 mm.

Figure 5:
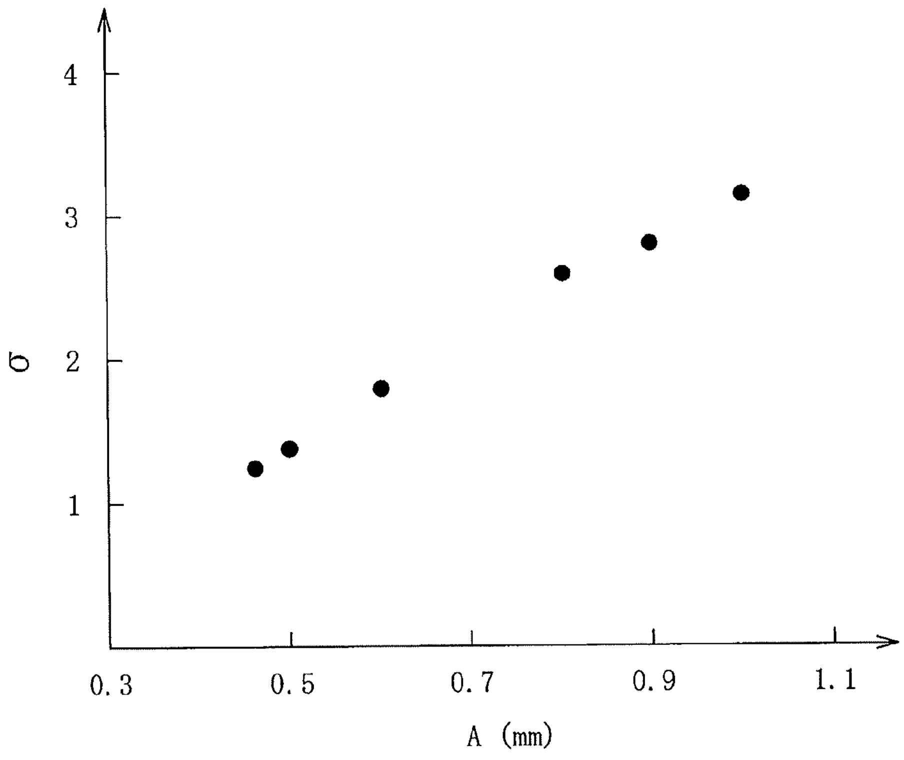
FIG. 5 illustrates the relationship between a distance A and the bending stress in the rear-end recessed portion.

FIG. 5 illustrates the relationship between the distance A and the bending stress σ in the rear-end recessed portion 32. FIG. 5 illustrates a graph in which, over samples Nos. 6 to 11 given in Table 2 and differing in distances A, the bending stress σ when the distance A is changed is calculated, the distance A is given on the horizontal axis, and the bending stress σ is given on the vertical axis. The thicknesses C are uniformly 0.85 mm in the samples Nos. 6 to 11, the curvature radius R is 0.10 mm in the samples Nos. 6 to 9 in which the distance A is less than or equal to 0.8 mm, and the curvature radius R is 0.14 mm in the samples Nos. 10 and 11 in which the distance A is more than or equal to 0.9 mm. The scales of the vertical axis each indicate a ratio of the bending stress.

TABLE 2

| No. | A (mm) | R (mm) |
|---|---|---|
| 6 | 0.46 | 0.10 |
| 7 | 0.50 | 0.10 |
| 8 | 0.60 | 0.10 |
| 9 | 0.80 | 0.10 |
| 10 | 0.90 | 0.14 |
| 11 | 1.00 | 0.14 |

It has been confirmed that the bending stress σ is smaller as the distance A is shorter as FIG. 5 illustrates. The distance A is more preferably less than or equal to 1.00 mm, particularly preferably less than or equal to 0.90 mm for decreasing the bending stress σ.

On the other hand, with the smaller thickness C, the energy of a flame kernel generated by spark discharge is hardly lost to the front end portion 15, and the flame kernel grows. Thus, ignitability is improved. The thickness C is preferably less than or equal to 0.90 mm, more preferably less than or equal to 0.85 mm for ensuring ignitability. Therefore, the distance A is preferably less than or equal to 0.90 mm, and the thickness C is preferably less than or equal to 0.90 mm for decreasing the bending stress σ in the rear-end recessed portion 32 and ensuring ignitability. The thickness C is more preferably less than or equal to 0.85 mm.

Figure 6:
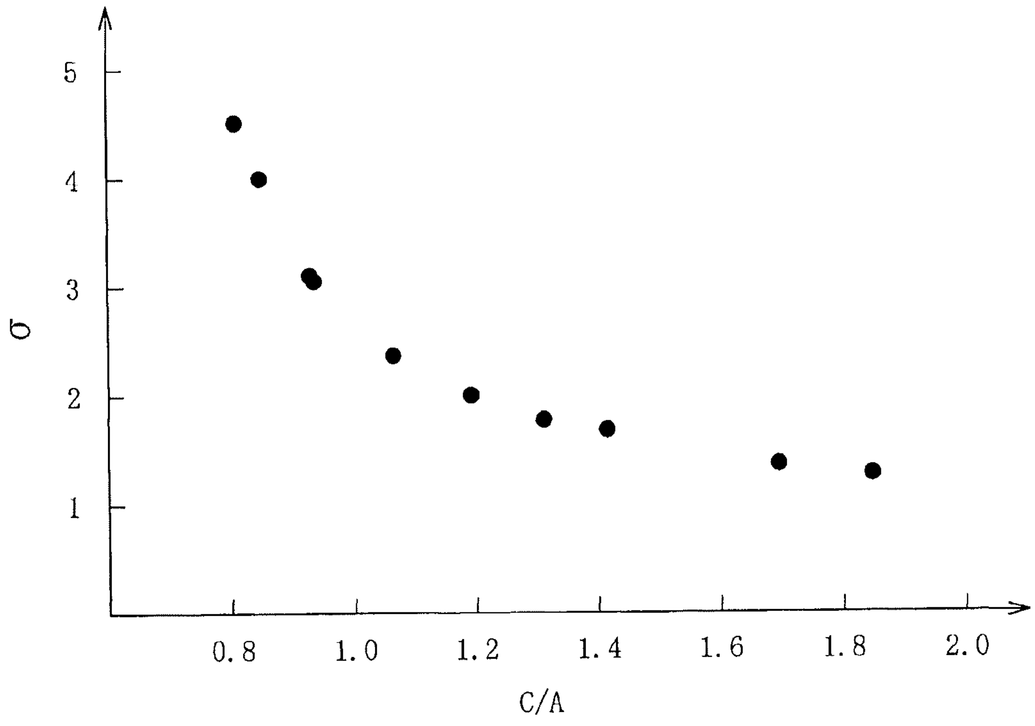
FIG. 6 illustrates the relationship between a value C/A and the bending stress in the rear-end recessed portion.

FIG. 6 illustrates the relationship between a value C/A obtained by dividing the thickness C by the distance A, and the bending stress σ in the rear-end recessed portion 32. FIG. 6 illustrates a graph in which, over samples Nos. 12 to 21 given in Table 3 and differing in distance A and thickness C, the bending stress σ when the distance A and the thickness C are changed is calculated, the value C/A is given on the horizontal axis, and the bending stress σ is given on the vertical axis. The curvature radius R is 0.10 mm in the samples Nos. 12 to 19 in which the distance A is less than or equal to 0.8 mm, and the curvature radius R is 0.14 mm in the samples Nos. 20 and 21 in which the distance A is more than or equal to 0.9 mm. The scales of the vertical axis each indicate a ratio of the bending stress.

TABLE 3

| No. | A (mm) | C (mm) | R (mm) |
|---|---|---|---|
| 12 | 0.46 | 0.85 | 0.10 |
| 13 | 0.50 | 0.85 | 0.10 |
| 14 | 0.60 | 0.85 | 0.10 |
| 15 | 0.80 | 0.85 | 0.10 |
| 16 | 0.80 | 0.75 | 0.10 |
| 17 | 0.80 | 0.95 | 0.10 |
| 18 | 0.80 | 0.65 | 0.10 |
| 19 | 0.80 | 1.05 | 0.10 |
| 20 | 0.90 | 0.85 | 0.14 |
| 21 | 1.00 | 0.85 | 0.14 |

The bending stress σ in the rear-end recessed portion 32 is smaller as the thickness C is larger, and is smaller as the distance A is shorter. Thus, the larger value C/A is preferable for decreasing the bending stress σ. It has been confirmed that the value C/A and the bending stress σ are inversely proportional to each other as FIG. 6 illustrates. It has been confirmed that the bending stress σ can be decreased substantially when the value C/A is more than or equal to 1.42.

Note that the smaller thickness C is preferable, and a certain length is necessary for the distance A for making the energy of a flame kernel, which is generated by spark discharge, hardly lost to the front end portion 15. In view of the above-described circumstances, the value C/A is preferably more than or equal to 1.42 for decreasing the bending stress σ in the rear-end recessed portion 32 and ensuring ignitability.

Because the rear-end recessed portion 32 is positioned at the base material 23 between the interface 36 of the melt portion 24 and the proximal end 20, easy control of the curvature radius R of the rear-end recessed portion 32 can be achieved when the rear-end recessed portion 32 is manufactured, compared with when the rear-end recessed portion 32 is positioned at the melt portion 24. Thus, easy control of the bending stress σ in the rear-end recessed portion 32 can be achieved.

Because the rear-end recessed portion 32 is positioned at the boundary between the first portion 25 and the second portion 28 narrower than the first portion 25, and the melt portion 24 is interposed between the second portion 28 and the tip 22, the volume from the second portion 28 to the tip 22 can be decreased compared with when no second portion 28 is provided. Because the heat capacity from the second portion 28 to the tip 22 can be made small, the energy of a flame kernel generated by spark discharge is hardly lost to the front end portion 15, and the flame kernel easily grows. As the results, ignitability is improved.

The larger curvature radius R of the rear-end recessed portion 32 is preferable, and the shorter distance A is preferable for decreasing the bending stress in the rear-end recessed portion 32. However, in view of ease of manufacture of the rear-end recessed portion 32, there is an optimum range for the curvature radius R. In addition, a certain length is necessary for the distance A for making the energy of a flame kernel, which is generated by spark discharge, hardly lost to the front end portion 15. In view of the above-described circumstances, the value R/A is preferably less than or equal to 0.3.

Although the present invention has been described above with reference to the embodiment, the present invention is not limited to the above-described embodiment, and it is readily understood that various improvements and modifications may be made without departing from the spirit of the present invention.

Although the proximal end 20 of the front end portion 15 of the center electrode 14 is positioned at the circular columnar portion 26 of the first portion 25 in the description of the embodiment, this is not the only option. As a matter of course, the proximal end 20 of the front end portion 15 may be provided at the conical portion 27 of the first portion 25 by shortening the length of a portion of the center electrode 14 projecting from the front end 12 of the insulator 11. In this case, of the recessed portions 32 and 34 included in each of the outlines 29 and 30 of the front end portion 15, the recessed portion 32 closest to the proximal end 20 is also the rear-end recessed portion.

Although the tip 22 is welded to the base material 23 of the center electrode 14 in the embodiment, this is not the only option. As a matter of course, the tip 22 and the melt portion 24 may be eliminated. In this case, the shape of the base material 23 described in the embodiment is the shape of the center electrode 14. When the tip 22 and the melt portion 24 are eliminated, one recessed portion 32 is included in each of the outlines 29 and 30 of the front end portion 15, and the recessed portion 32 is the rear-end recessed portion. As a matter of course, for improving a property such as resistance to spark erosion, a coating containing a noble metal element may be provided on a surface of the front end portion 15 of the center electrode 14 from which the tip 22 and the melt portion 24 are eliminated.

Although the second portion 28 has a circular columnar shape in the description of the embodiment, this is not the only option. As a matter of course, similarly to the conical portion 27 of the first portion 25, the second portion 28 may have a conical shape.

When the second portion 28 has a conical shape, the second portion 28 may be connected to the conical portion 27 of the first portion 25 or may be connected to the circular columnar portion 26 by eliminating the conical portion 27 of the first portion 25. When the conical second portion 28 is connected to the conical portion 27 of the first portion 25, an angle formed by an outline of the second portion 28 in a section including the axial line O and the axial line O is made smaller than an angle formed by an outline of the conical portion 27 in the section including the axial line O and the axial line O, for providing a recessed portion between the first portion 25 and the second portion 28. When the conical second portion 28 is connected to the circular columnar portion 26 by eliminating the conical portion 27 of the first portion 25, the diameter of a bottom surface of the second portion 28 is made smaller than the diameter of the circular columnar portion 26, for providing a recessed portion between the first portion 25 and the second portion 28.

Although the circular columnar second portion 28 is connected to the conical portion 27 of the first portion 25 in the description of the embodiment, this is not the only option. The circular columnar second portion 28 may be connected to the circular columnar portion 26 of the first portion 25 by eliminating the conical portion 27 of the first portion 25. In this case, the diameter of the second portion 28 is made smaller than the diameter of the circular columnar portion 26 for providing a recessed portion between the first portion 25 and the second portion 28.

DESCRIPTION OF REFERENCE NUMERALS

10 spark plug
11 insulator
12 front end
13 axial hole
14 center electrode
15 front end portion
20 proximal end
21 electrode tip end
22 tip
23 base material
24 melt portion
25 first portion
28 second portion
29, 30 outline
32 rear-end recessed portion (recessed portion)
34 recessed portion

What is claimed is:

1. A spark plug, comprising:
an insulator having an axial hole extending from a front end toward a rear end side; and
a center electrode disposed in the axial hole of the insulator and extending along an axial line, the center electrode including a front end portion projecting from the front end of the insulator,
wherein, in a section including the axial line, the front end portion includes a proximal end positioned at the front end of the insulator in a direction where the axial line extends and an electrode tip end having a width smaller than a width of the proximal end,
wherein at least one outline appearing in the section and connecting the proximal end and the electrode tip end of the front end portion to each other includes one or more recessed portions recessed toward the axial line, and
wherein, a value R/A obtained by dividing a curvature radius R of a rear-end recessed portion, of the one or more recessed portions, closest to the proximal end by a distance A between the rear-end recessed portion and the electrode tip end in the direction of the axial line is more than or equal to 0.12.

2. The spark plug according to claim 1, wherein the value R/A is more than or equal to 0.22.

3. The spark plug according to claim 1, wherein a thickness C, in a direction vertical to the axial line, of the front end portion at the rear-end recessed portion is more than or equal to 0.8 mm.

4. The spark plug according to claim 3, wherein the distance A is less than or equal to 0.9 mm, and the thickness C is less than or equal to 0.9 mm.

5. The spark plug according to claim 3, wherein a value C/A obtained by dividing the thickness C by the distance A is more than or equal to 1.42.

6. The spark plug according to claim 1, wherein the front end portion includes:
a base material including the proximal end,
a tip including the electrode tip end and containing a noble metal, and
a melt portion formed between the tip and the base material,
wherein the base material includes the rear-end recessed portion, and
wherein the at least one outline comprises two outlines, and the melt portion is formed continuously between the two outlines positioned on both sides relative to the axial line.

7. The spark plug according to claim 1, wherein the front end portion includes:
a first portion including the proximal end,
a second portion adjacent to a front end side of the first portion and narrower than the first portion,
a tip including the electrode tip end and containing a noble metal, and
a melt portion formed between the tip and the second portion, and
wherein the rear-end recessed portion is positioned at a boundary of the first portion and the second portion.

8. The spark plug according to claim 1, wherein the value R/A is less than or equal to 0.3.

* * * * *